(12) United States Patent
Lin et al.

(10) Patent No.: US 11,543,492 B2
(45) Date of Patent: Jan. 3, 2023

(54) DETECTION DEVICE FOR A MOTOR VEHICLE, ATTACHED PART AND MOTOR VEHICLE

(71) Applicant: Valeo Schalter und Sensoren GmbH, Bietigheim-Bissingen (DE)

(72) Inventors: Lin Lin, Bietigheim-Bissingen (DE); Peter Horvath, Bietigheim-Bissingen (DE); Thomas Schuler, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 950 days.

(21) Appl. No.: 16/337,805

(22) PCT Filed: Sep. 29, 2017

(86) PCT No.: PCT/EP2017/074746
§ 371 (c)(1),
(2) Date: Mar. 28, 2019

(87) PCT Pub. No.: WO2018/060407
PCT Pub. Date: Apr. 5, 2018

(65) Prior Publication Data
US 2019/0227147 A1 Jul. 25, 2019

(30) Foreign Application Priority Data
Sep. 29, 2016 (DE) .................... 10 2016 118 471.3

(51) Int. Cl.
*G01S 17/931* (2020.01)
*G01S 7/481* (2006.01)

(52) U.S. Cl.
CPC .......... *G01S 7/4814* (2013.01); *G01S 7/4817* (2013.01); *G01S 17/931* (2020.01)

(58) Field of Classification Search
CPC .... G01S 7/4814; G01S 7/4817; G01S 17/931; G01S 7/4816; G01S 7/4818
See application file for complete search history.

(56) References Cited

U.S. PATENT DOCUMENTS

| 5,291,261 A | * | 3/1994 | Dahl ................ G01S 17/04 250/208.2 |
| 9,671,548 B2 | * | 6/2017 | Wald .................. G02B 6/0053 |
| 2005/0024625 A1 | * | 2/2005 | Mori ................ G01S 17/42 356/4.01 |

FOREIGN PATENT DOCUMENTS

| DE | 9103492 U1 | 7/1991 |
| DE | 4040894 C1 | 4/1992 |

(Continued)

OTHER PUBLICATIONS

International Search Report and Written Opinion issued in corresponding International Patent Application No. PCT/EP2017/074746, dated Dec. 15, 2017 (13 pages).

(Continued)

*Primary Examiner* — Jennifer Doan
(74) *Attorney, Agent, or Firm* — Osha Bergman Watanabe & Burton LLP

(57) ABSTRACT

The invention relates to an optical detection device (3) for arranging on an attached part (5, 7) of a motor vehicle (1) and for monitoring a region (4, 6) adjacent to the attached part (5, 7), with a transmitting apparatus (11) comprising a light source (13) and with a receiving apparatus (12) comprising a sensor (22). The transmitting apparatus (11) is designed to transmit light beams (18) along predetermined scanning directions (A1, A2, A3, A4) into the region (4, 6), and the receiving apparatus (12) is designed to receive the fractions (19) of the light beams (18) reflected in the region (4, 6).

13 Claims, 4 Drawing Sheets

(56) References Cited

FOREIGN PATENT DOCUMENTS

DE 19927501 A1 11/2000
EP 0441555 A2 8/1991

OTHER PUBLICATIONS

Search Report issued in corresponding German Patent Application No. 10 2016 118 471.3, dated May 15, 2017 (6 pages).

* cited by examiner

DETECTION DEVICE FOR A MOTOR VEHICLE, ATTACHED PART AND MOTOR VEHICLE

The invention relates to an optical detection device for a motor vehicle for arranging at an attached part of the motor vehicle and for monitoring a region adjacent to the attached part, with a transmitting apparatus comprising a light-emitting light source and with a receiving apparatus comprising a light-sensitive sensor, wherein the transmitting apparatus is so designed as to transmit light beams along predetermined scanning directions into the region, and the receiving apparatus is so designed as to receive fractions of the light beams reflected in the region. The invention further relates to an attached part with at least one optical detection device and to a motor vehicle with at least one attached part.

In the present case the interest is focused on optical detection devices for motor vehicles, in particular lidar systems (lidar. "light detection and ranging"). A surrounding region of the motor vehicle, for example, can be monitored by means of such lidar systems. Objects in the surrounding region can here be detected, and information about the detected objects, for example a position of the objects relative to the motor vehicle, can be provided to a driver assistance system of the motor vehicle. The driver assistance system can, on the basis of this information, initiate measures for the avoidance of a collision of the motor vehicle with the objects, for example brake the motor vehicle automatically before the collision, and/or park the motor vehicle at least semi-autonomously.

With lidar systems, for example laser scanners, according to the prior art a light beam, for example a laser beam, is usually transmitted along a scanning direction into the surrounding region and the surrounding region is sampled or scanned by changing a scanning angle or the scanning direction. As soon as the light beam meets an object in the surrounding region, at least a fraction of the light beam is reflected at the object back to the laser scanner. A receiving apparatus of the laser scanner receives the reflected fraction of the light beam and determines a distance of the object with respect to the motor vehicle on the basis of a transit time of the light, or of a time duration between the transmission of the light beam and the reception of the reflected fraction of the light beam. With knowledge of the scanning angle as the light beam is transmitted, an orientation or a direction of the object with respect to the motor vehicle can also be determined. The position of the object relative to the motor vehicle can then be determined from the orientation and from the distance.

To change the scanning angle, the light beam is rotated as it is transmitted into the surrounding region, as described, for example, in DE 19927501 A1. The light beam can, for example, for this purpose be transmitted from the light source on a rotating mirror of the laser scanner which reflects the light beam along the different scanning directions, while the respective scanning directions are set by a pivot angle or an orientation of the rotating mirror.

Such an optical detection device according to the prior art is usually awkward and cannot be flexibly shaped, since the components of the optical detection device are usually arranged in a box-like housing. Restrictions in respect of the installation location of the optical detection device on the motor vehicle result from this. A design of the motor vehicle, in particular of an attached part at which the optical detection device according to the prior art is arranged, can thus not be chosen freely, since a space requirement of the awkward detection device must be allowed for.

It is an object of the present invention to design an optical detection device for a motor vehicle particularly flexibly and reliably, so that, in particular, a mounting location for the detection device on the motor vehicle can be chosen freely.

This object is achieved according to the invention by an optical detection device, an attached part and a vehicle according to the respective independent patent claims. Advantageous embodiments of the invention are subjects of the dependent patent claims, of the description and of the figures.

According to one embodiment of an optical detection device for a motor vehicle for arranging at an attached part of the motor vehicle and for monitoring a region adjacent to the attached part, this comprises a transmitting apparatus comprising a light-emitting light source and a receiving apparatus comprising a light-sensitive sensor, wherein the transmitting apparatus is so designed as to transmit light beams along predetermined scanning directions into the region, and the receiving apparatus is so designed as to receive fractions of the light beams reflected in the region. In particular, the transmitting apparatus comprises a first light guidance apparatus for guiding the light emitted by the light source along a surface of the attached part and at least two outward coupling elements, corresponding to respective scanning directions, for coupling fractions of the guided light as the light beams oriented along the respective scanning direction. In particular, the receiving apparatus comprises at least two inward coupling elements corresponding to respective scanning directions for coupling in the fractions of the light beams reflected out of the region along the respective scanning direction, and a second light guidance apparatus for guiding the inwardly coupled fractions of the light beams to the light-sensitive sensor.

An optical detection device for a motor vehicle for arranging at an attached part of the motor vehicle and for monitoring a region adjacent to the attached part preferably comprises a transmitting apparatus comprising a light-emitting light source and a receiving apparatus comprising a light-sensitive sensor, wherein the transmitting apparatus is so designed as to transmit light beams along predetermined scanning directions in the region, and the receiving apparatus is so designed as to receive fractions of the light beams reflected in the region. The transmitting apparatus moreover comprises a first light guidance apparatus for guiding the light emitted by the light source along a surface of the attached part and at least two outward coupling elements, corresponding to respective scanning directions, for coupling fractions of the guided light as the light beams oriented along the respective scanning direction. The receiving apparatus further comprises at least two inward coupling elements corresponding to respective scanning directions for coupling in the fractions of the light beams reflected out of the region along the respective scanning direction, and a second light guidance apparatus for guiding the inwardly coupled fractions of the light beams to the light-sensitive sensor.

The optical detection device, which is in particular designed as a lidar system, can be arranged on the attached part of the motor vehicle and monitor the region adjacent to the attached part. The attached part can, for example, be an outer cladding part of the motor vehicle, in particular a bumper of the motor vehicle, so that the optical detection device can monitor a surrounding region outside the motor vehicle as the region. The optical detection device can, for example, detect objects in the surrounding region. Such objects can, for example, be obstacles, kerbstones, pedestrians etc. The attached part can also, for example, be an interior component of the motor vehicle, so that the optical detection device monitors an interior or a passenger compartment of the motor vehicle as the region. Such an interior component can, for example, be an interior cladding part of an instrument panel and/or of a central console, a steering wheel, a roof liner etc. A hand of a driver of the motor vehicle can, for example, be detected as the object, such that gestures of the driver can be recognized for the operation of equipment in the vehicle, such as infotainment components.

The optical detection device comprises the transmitting apparatus which comprises the light source for transmitting the light, in particular laser light. The light transmitted from the light source, which for example comprises at least one transmitting element in the form of a laser diode or an LED, is fed to the first light guidance apparatus which can be arranged on the surface of the attached part. In particular, the first light guidance apparatus can be arranged on a surface of the attached part facing away from the region, for example at a rear side of the bumper and/or of the interior component. The attached part can here have openings through which the light can penetrate from the rear side to a front side that faces the region. The first light guidance apparatus is so designed as to guide light along a light guidance direction or a light propagation direction, along which the first light guidance apparatus extends. The light guidance direction thus corresponds to a direction of extension of the first light guidance apparatus.

When the optical detection device is mounted on the attached part, the light guidance direction here extends along, in particular parallel, to the surface or to a contour of the attached part. The first light guidance apparatus is thus so designed as to guide the light along the contour of the attached part. The contour can for example here be convex, so that the light propagation direction along which the light is guided through the first light guidance apparatus is oriented essentially parallel to the surface. The light can, for example, be guided along a longitudinal direction of the attached part. The light source can thus, for example, be arranged at one end of the bumper, and the light guided along a length of the bumper. The first light guidance apparatus can thus be adjusted flexibly to the surface curvature of the attached part. Expressed otherwise, the first light guidance apparatus can be shaped freely in particular along the longitudinal direction of the attached part or the direction of extension of the first light guidance apparatus.

To generate the light beams oriented along the scanning directions or scanning angle, fractions of the light guided in the first light guidance apparatus are tapped off by means of the outward coupling elements and transmitted into the surrounding region as light beams. The scanning directions are here oriented essentially perpendicular to the light propagation direction, or perpendicular to the surface of the attached part. For this purpose, the outward coupling elements are arranged, starting from the light source, in particular at regular intervals along the light propagation direction, so that light beams are oriented in the surrounding region at regular spacings. Through the light beams oriented along the different scanning directions, in particular scanning direction regions, an angular range in the region adjacent to the attached part is illuminated, which corresponds to a field of view or to a detection region of the transmitting apparatus. In the case of a detection device arranged at a bumper, the field of view extends along the bumper and spreads out in the region, starting in particular from the bumper.

In addition, the optical detection device comprises the receiving apparatus which comprises the light-sensitive sensor. The sensor can, for example, comprise a matrix arrangement of light-sensitive sensor elements or pixels, for example photodiodes. The light reflected in the region, for example at an object, is fed to this sensor by means of the second light guidance apparatus, so that the sensor can determine a distance of the object from the attached part on the basis of a transit time of the light. The second light guidance apparatus is also designed to be able to be flexibly shaped, so that it can, for example, also be arranged at the surface of the attached part and guide the reflected fraction of the light along the surface of the attached part to the sensor. To couple the reflected light into the second light guidance apparatus, the receiving apparatus comprises the inward coupling elements, wherein each inward coupling element can collect light from a specific scanning direction, in particular a specific scanning direction range, and feed it to the second light guidance apparatus. An angular range from which the inward coupling elements couple the reflected fractions into the second light guidance apparatus corresponds to a field of view of the receiving apparatus.

The optical detection device can be arranged flexibly at the motor vehicle due to the light guidance apparatuses which can be shaped in such a way that they can be adapted to the surface curvature of the attached part. The optical detection device can, in particular, also be arranged at installation locations with little available space, for example integrated into the bumper or the instrument panel. The optical detection device is therefore of a particularly space-saving design, whereby an appearance or design of the motor vehicle can be designed independently of the optical detection device.

The light source and the light-sensitive sensor are preferably arranged on a common carrier, wherein the first light guidance apparatus is designed to guide the light emitted by the light source starting from the carrier along the surface of the attached part, and the second light guidance apparatus is designed to feed the reflected fractions of the light beams back along the surface to the carrier. If the light source and the sensor are arranged on a common carrier, for example a circuit board, the light source and the sensor can be contacted particularly easily and at little expense, for example for the supply of energy. The light emitted by the light source can be guided away from the carrier in the longitudinal direction of the attached part through the flexible light guidance apparatuses, and fractions of the light can be radiated into the region by means of the outward coupling elements. The reflected fractions of the light beams are coupled in again by means of the inward coupling elements and guided back to the carrier in the opposite longitudinal direction.

The second light guidance apparatus particularly preferably comprises optical waveguides corresponding to the scanning directions, each optical waveguide being optically coupled to one inward coupling element and being designed to guide the respective fraction of the light beams reflected along the scanning direction out of the region to the light-sensitive sensor. In particular, each optical waveguide is optically coupled to one respective sensor region comprising at least one sensor element of the light-sensitive sensor. The respective sensor region is here designed to determine a distance of the object from the attached part on the basis of a transit time of the transmitted light beam and of the fraction of the light beam reflected at an object, and also to determine the respective scanning direction on the basis of the associated optical waveguide. In an advantageous manner, the sensor takes a transit time of the light in the light guidance apparatuses, which causes a time delay, into consideration when determining the distance of the object. The transit time of the light can be determined on the basis of a length of the attached part and of a propagation velocity of the light in the light guidance apparatuses, said velocity depending on a material of the light guidance apparatuses.

Optical waveguides or fibre-optic cables are optical elements of elongated shape which can guide light in their interior through total reflection. Such optical waveguides are particularly flexible, since they can be bent without damage and can thus also be arranged on convex contours or surfaces. Any optical waveguide can thus be freely shaped. The optical waveguides are in particular formed of PMMA (polymethylmethacrylate) which transmits light particularly well, is resistant to weather and ageing, and can be very easily shaped. Each inward coupling element and the associated free-form optical waveguide coupled to the inward coupling element form a receiving channel, wherein each receiving channel corresponds to a scanning direction, in particular to a scanning direction range. This means that each receiving channel in particular only receives the light reflected from the associated scanning direction. Each receiving channel is here optically coupled to at least one sensor element or pixel of the sensor. As soon as the light is reflected back along a particular scanning direction out of the region to the optical detection device, it is coupled in via the corresponding receiving channel and fed to the sensor region that is optically coupled to the receiving channel. As soon as a sensor region detects light it can determine the scanning direction on the basis of the associated receiving channel, and also determine the distance of the object on the basis of the transit time of the light. The receiving apparatus of the optical detection device is thus designed to resolve angles in a particularly simple manner by means of the optical waveguides.

According to a first embodiment of the invention, the first light guidance apparatus comprises an optical waveguide for guiding the light along the surface of the attached part, wherein the optical waveguide comprises at least two reflection elements corresponding to respective scanning directions to form the outward coupling elements, said reflection elements being designed to reflect a respective fraction of the light guided in the optical waveguide along the respective scanning direction into the region. The first light guidance apparatus can thus also be designed as an optical waveguide, made for example of PMMA, which can be shaped freely and can be arranged at the surface of the attached part. The optical waveguide guides the light emitted by the light source and coupled into the optical waveguide along the surface of the attached part. For this purpose, the optical waveguide can for example have a length that corresponds approximately to the length of the attached part. The light is, for example, coupled in at an inward coupling surface at one end of the optical waveguide and guided by total reflection in the light propagation direction along the length of the optical waveguide. The total reflection is interrupted to couple fractions of the light out as light beams. The optical waveguide comprises the reflection elements spaced apart from one another along the length of the optical waveguide for this purpose, so that a first fraction of the light is guided onward within the optical waveguide after the reflection at the reflection element, and a second fraction of the light emerges as a light beam out of the optical waveguide into the region. The light beams are thus shaped by means of the reflection elements and are oriented in the region along the respective scanning directions belonging to the reflection elements.

It has been found to be advantageous if the reflection elements are arranged with a spacing from one another starting from the light source, wherein a reflectivity of the respective reflection elements is predetermined depending on a spacing of the respective reflection elements from the light source. This means, in other words, that the reflection elements have different reflectivities or reflectances. An optical density of the first light guidance apparatus in the longitudinal direction is thereby varied or changed. In particular, the reflectance of the reflection elements rises with increasing distance from the light source. The proportion of the light reflected at a reflection element that emerges as a light beam into the region thus increases with increasing distance from the light source. The invention is based on the recognition of the fact that through coupling the light beams out into the region, a light quantity or intensity of the light being guided onward in the optical waveguide falls as the distance from the light source increases. By matching the reflectance to the distance of the reflection elements from the light source, it is possible to ensure that a light quantity of the light that is coupled out as a light beam into the region remains constant even as the distance from the light source rises, and thus the field of view is illuminated homogeneously or evenly over the entire length.

It can be provided here that the first light guidance apparatus comprises a layer with a reflective structure partially surrounding the optical waveguide and extending along a length of the optical waveguide, wherein the reflection elements are formed as structured regions of the reflecting structure and are designed to reflect fractions of the light guided in the optical waveguide as the light beams into the region adjacent to the attached part. The reflecting structure has, in particular, a sawtooth form. The reflecting layer thus forms a first cladding partial region for the optical waveguide that surrounds regions of a light-carrying core of the optical waveguide. The reflecting layer can, for example, be arranged on a side of the optical waveguide facing away from the surface of the attached part, and thus lie opposite the surface of the attached part. A second cladding partial region of the optical waveguide without the reflecting structure, which is arranged for example on a side of the optical waveguide facing toward the surface of the attached part and thus opposite to the reflecting structure, here forms an outlet surface for the light reflected by the structured regions into the region. The second cladding partial region without the reflecting structure can, for example, comprise a structure that is transmissive for the light beam, through which the total reflection can also be interrupted. A characteristic of the emerging light beam, i.e. for example the respective scanning directions and an intensity of the light beam, can be influenced by the reflecting structure. The characteristic can, for example, be influenced by an angle, a depth, a size and an edge sharpness of the sawtooth-shaped structure.

In a development of the first embodiment of the invention, the receiving apparatus comprises lens elements corresponding to the scanning directions for the formation of the inward coupling elements, said lens elements being designed to couple the fractions of the light beams reflected out of the region along the scanning direction into the second light guidance apparatus. The lens elements or collimators can be designed as micro-lenses, and arranged in an optical path between the region and the second light guidance apparatus. Each optical waveguide of the second light guidance apparatus can here for example be optically coupled to a lens element that can focus the light reflected in the region to the optical detection device into the associated optical waveguide. The lens elements can, for example, be arranged above openings of the attached part through which the light from the region adjacent to the front side of the attached part can be guided to the optical waveguides arranged on the rear side. The lens elements can in particular be recessed in at least some regions into the attached part, so that the front side of the attached part and a front side of the lens elements are subsequently formed essentially flush with one another. The fraction of the light beam reflected from a scanning direction region with the respective scanning direction can be collected by the lens element, and a field of view of the individual receiving channels thus enlarged. The field of view of the total receiving apparatus can thus also be extended or enlarged.

It has been found to be advantageous here if the transmitting apparatus also comprises lens elements or collimators, wherein each lens element is assigned to a reflection element and optically coupled to it, and is arranged in an optical path between the reflection element and the region of the attached part. According to the first embodiment of the invention, the transmitting apparatus thus comprises a transmitter-side collimator lens and the receiving apparatus a receiver-side collimator lens. The light beam formed by the reflection elements is widened by the lens elements as it emerges into the region, and a field of view of the transmitting apparatus thereby enlarged. A divergence of the light transmitted by the transmitting apparatus is thus matched to the field of view of the receiving channels. The formation of dead angles, or partial regions in the region that are not illuminated, can be prevented in this way.

According to a second embodiment of the invention, the first light guidance apparatus comprises at least two beam splitters corresponding to the scanning directions, said splitters being designed to guide the light emitted from the light source along the surface of the attached part through transmission, and which are designed, for the formation of the outward coupling elements, to reflect fractions of the light as the light beams into the region along the respective scanning direction and, for the formation of the inward coupling elements, to transmit the fractions of the light beams reflected along the respective scanning direction and feed them to the second light guidance apparatus.

According to this embodiment, the beam splitters thus form in particular both the first light guidance apparatus and also the outward coupling elements and the inward coupling elements. The beam splitters are here arranged, starting from the light source, with an increasing distance from the light source along the surface of the attached part. Each beam splitter here transmits a fraction of the light of the light source to the next beam splitter in the light guidance direction. Each beam splitter also reflects a fraction of the light into the region along the respective scanning direction assigned to the beam splitter, that is in particular perpendicular to the light guidance direction. The light reflected in the region again arrives back at the beam splitters which simultaneously constitute the inward coupling elements and transmit the light in the direction of the second light guidance apparatus. Each beam splitter can here be optically coupled to an optical waveguide of the second light guidance apparatus, so that the light beam reflected out of the region can be fed to the corresponding sensor region. Each beam splitter, with the associated optical waveguide, thus here forms a receiving channel. By means of the beam splitters, which can be arranged separately from one another at the surface of the attached part, it is thus possible, using few components, to provide an optical detection device that can be freely shaped, flexibly arranged and is reliable.

It has been found to be advantageous if the beam splitters are arranged with a spacing from one another starting from the light source, wherein a transmissivity of the respective beam splitters is determined depending on a spacing of the respective beam splitters from the light source. This, in other words, means that the beam splitters have different transmissivities or transmittances. In particular, the transmittance of the beam splitters falls with increasing distance from the light source. The proportion of the light reflected into the region from a beam splitter in comparison with the transmitted light thus increases with increasing distance from the light source. In turn, as a result, a constant light quantity that is coupled out as a light beam is achieved over a total length of the first light guidance apparatus, and thus in particular over the entire length of the attached part. Through the adaptation of the transmittance to the distance of the beam splitters from the light source, it can in turn be ensured that the field of view is illuminated homogeneously or evenly over the total length.

It can be provided here that the optical detection device comprises lens elements corresponding to the scanning directions which are arranged in a beam path between the beam splitters and the region and which are designed to transmit the light beam reflected by the beam splitters along the respective scanning direction into the region and to transmit the fraction of the light beam reflected from the region out of the region along the respective scanning direction to the beam splitter. The respective lens elements are thus arranged in particular perpendicularly to the light guidance direction in front of the beam splitters. The light beams that are reflected from the respective beam splitter in the direction of the respective lens element thus emerge through the respective lens element into the region and are thereby widened. The light reflected in the region is again guided through the respective lens element to the beam splitter which guides the reflected light to the second light guidance apparatus. According to this form of embodiment, the transmitting apparatus and the receiving apparatus use the same lens elements or the same collimator lens, whereby the fields of view of the transmitting apparatus and of the receiving apparatus can be matched to one another. The optical detection device can, moreover, thus be formed in a particularly simple and space-saving manner.

The invention further relates to an attached part for a motor vehicle comprising at least one optical detection device, wherein the light guidance apparatuses are arranged at a surface of the attached part facing away from the region, and are designed to guide the light along the surface of the attached part. In particular, the attached part has openings corresponding to the inward coupling elements and the outward coupling elements for the provision of an optical path between the region adjacent to the attached part and the light guidance apparatuses. The attached part is preferably formed as a bumper and/or an interior component of the motor vehicle. The light guidance apparatuses, the light source and the sensor are here arranged in particular at a rear side of the attached part, wherein the light guidance apparatuses extend at least partially over a length of the attached part. The light guidance apparatuses can here extend parallel to a contour or a surface curvature, which can for example be convex, and guide the light along the surface.

A motor vehicle according to the invention comprises at least one attached part according to the invention. The motor vehicle is in particular designed as a passenger car. The optical detection device arranged on the attached part can detect objects in the region adjacent to the attached part. Obstacles in a surrounding region outside the motor vehicle can, for example, be detected. Information about the obstacle, for example a position of the obstacle relative to the motor vehicle, can be fed to a control apparatus of the motor vehicle, which can thereupon execute assistance functions. The control apparatus can, for example, park the motor vehicle autonomously. Gestures of a driver of the motor vehicle, which the driver carries out with his hands in a passenger compartment of the motor vehicle to operate apparatuses of the motor vehicle, for example infotainment components, can moreover be recognized.

The preferred embodiments presented with reference to the optical detection device according to the invention and their advantages apply correspondingly to the attached part according to the invention and to the motor vehicle according to the invention.

Further features of the invention emerge from the claims, the figures and the description of the figures. The features and feature combinations referred to in the description above, and also the features and feature combinations referred to below in the description of the figures and/or only illustrated in the figures, can be used not only in the respectively indicated combination, but also in other combinations or alone without leaving the scope of the invention. Embodiments of the invention that are not explicitly shown and explained in the figures, but which emerge and can be developed from separate combinations of features from the embodiments that are explained, are thus to be deemed as included and disclosed. Embodiments and combinations of features which thus do not exhibit all the features of an originally formulated independent claim are also to be deemed to be disclosed. Embodiments and feature combinations, in particular by the embodiments disclosed above, which go beyond or deviate from the feature combinations disclosed in the back-references of the claims are, in addition, to be deemed as disclosed.

Here:

Elements that are identical or which have identical functions are given the same reference signs in the figures.

Figure 1:
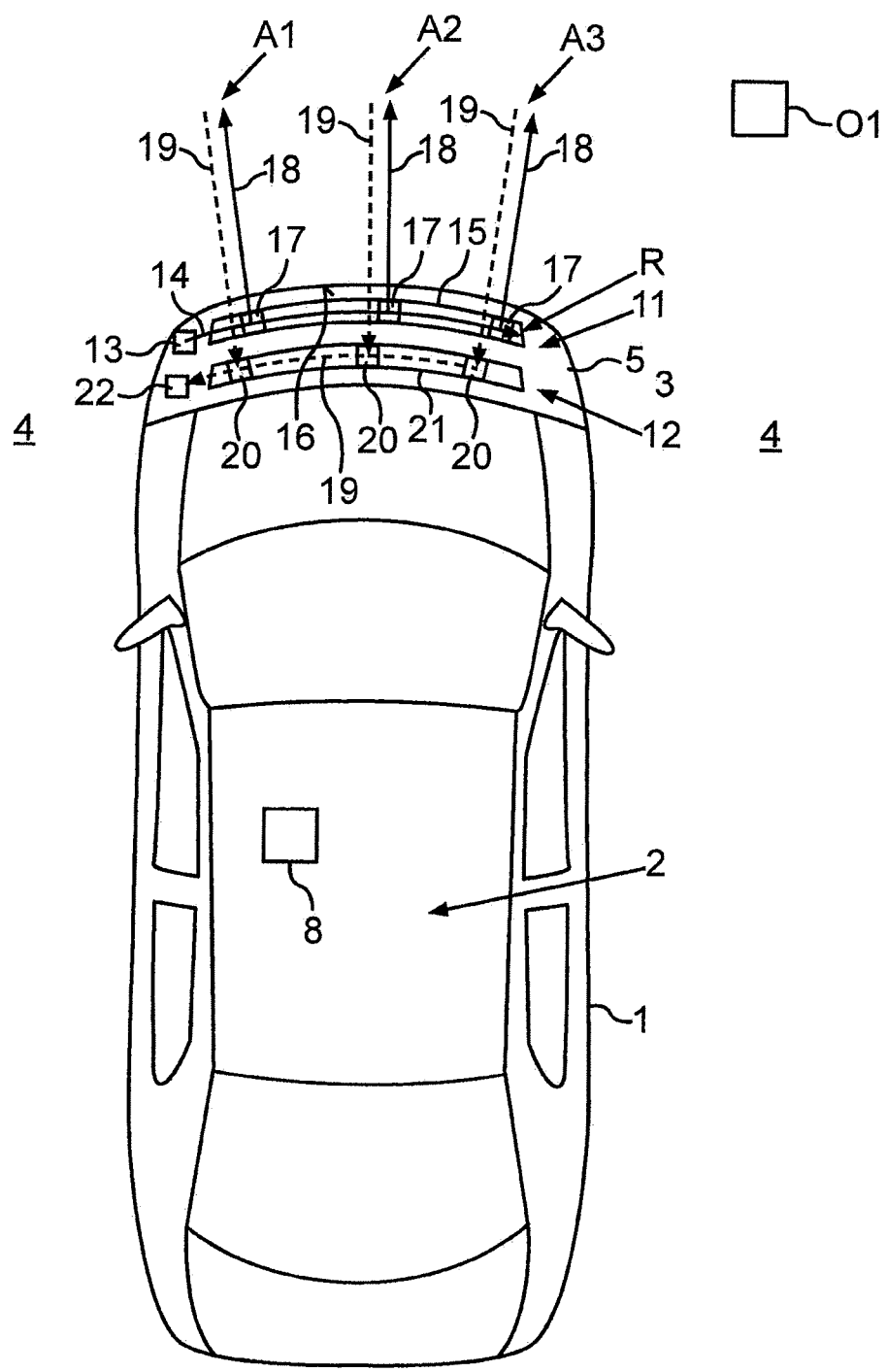
FIG. 1 shows a plan view of a schematic illustration of a embodiment of a motor vehicle according to the invention.
Figure 2:
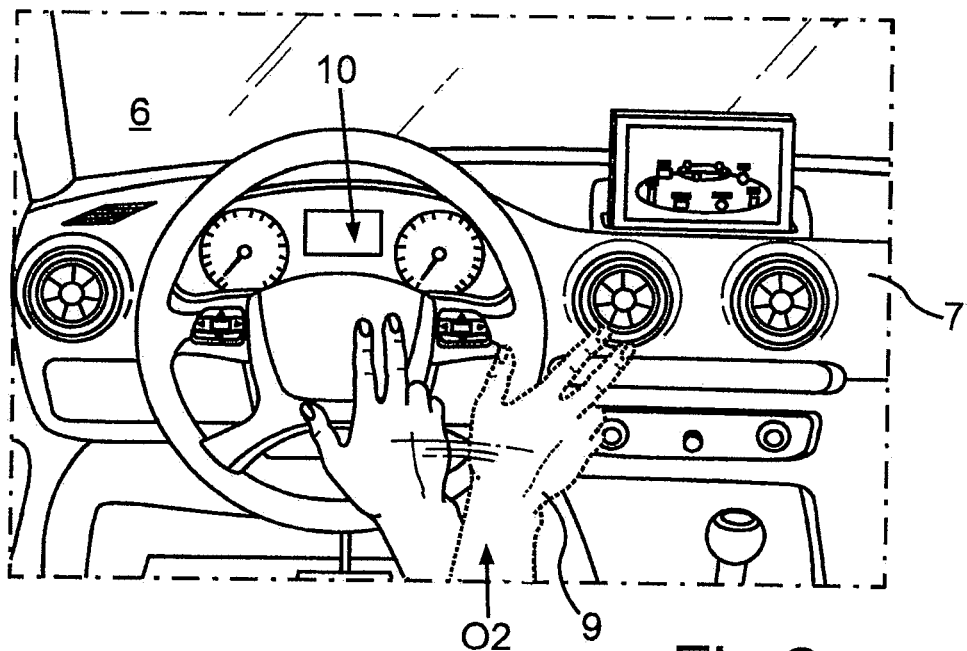
FIG. 2 shows a schematic illustration of an interior of a embodiment of a motor vehicle according to the invention.

FIG. 1 shows a motor vehicle 1 which is designed in the present case as a passenger car. The motor vehicle 1 comprises a driver assistance system 2 which can support a driver of the motor vehicle 1 when driving the motor vehicle 1. The driver assistance system 2 comprises for this purpose an optical detection device 3 which is designed to monitor a region of the motor vehicle 1. The optical detection device 3 is arranged for this purpose at an attached part of the motor vehicle 1 that is adjacent to the region. In the present case, the optical detection device 3 monitors a surrounding region 4 outside the motor vehicle 1 as the region. The optical detection device 3 is arranged for this purpose here at a bumper 5 as the attached part, in particular at a rear side of the bumper 5 that faces away from the region. The detection device 3 can be arranged here at a front-end bumper 5 and/or at a rear-end bumper 5. It can, however, also be provided, as shown in FIG. 2, that the optical detection device 3 monitors an interior space 6 or a passenger compartment of the motor vehicle 1 as the region, and is arranged for this purpose on a rear side of an interior component 7 as the attached part. The interior component 7 can, for example, be an interior cladding part and/or also the steering wheel of the motor vehicle 1.

The optical detection device 3 is designed, for monitoring the region 4, 6, to detect objects O1 (see FIG. 1), O2 (see FIG. 2) in the region 4, 6, and also to determine their position with respect to the attached part 5, 7, i.e. a distance and also an orientation of the objects O1, O2. According to FIG. 1, the detection device 3 can, for example, detect an obstacle for the motor vehicle 1 as the object O1, so that a control apparatus 8 of the driver assistance system 2 can, for example, automatically brake the motor vehicle 1 in order to avoid a collision of the motor vehicle 1 with the obstacle and/or can autonomously park the motor vehicle 1. According to FIG. 2, the detection device 3 can for example detect a hand 9 of a driver of the motor vehicle 1 as the object O2, in order to recognize a gesture of the driver on the basis of a change in the position of the hand 9. On the basis of the gesture, the control apparatus 8 can carry out assistance functions, for example control infotainment components such as a display apparatus 10 of the motor vehicle 1.

The optical detection device 3, whose manner of functioning is here described by way of example with reference to FIG. 1, and whose manner of functioning can be transferred to the exemplary embodiment according to FIG. 2, is designed as a lidar system, and comprises a transmitting apparatus 11 and a receiving apparatus 12. The transmitting apparatus 11 comprises a light source 13 which is designed to emit light 14, for example laser light. The transmitting apparatus also comprises a first light guidance apparatus 15 which guides the light 14 emitted from the light source 13 along a surface 16 of the attached part 5, in this case along the rear side of the attached part 5. The surface 16 of the attached part 5 can be convex here. The first guidance apparatus 15 guides the light 14 along a light guidance direction R or light propagation direction, which is oriented essentially parallel to the surface 16 and along a length of the attached part 5. The transmitting apparatus 11 also comprises outward coupling elements 17 which are designed to tap off fractions of the guided light 14 and to transmit them as light beams 18 that are oriented along different scanning directions A1, A2, A3, into the surrounding region 4. An outward coupling element 17 for generating the light beam 18 oriented along the respective scanning direction A1, A2, A3 is assigned to each scanning direction A1, A2, A3.

The fractions 19 of the light beams 18 reflected along the scanning directions A1, A2, A3 are received again by the receiving apparatus 12. The receiving apparatus 12 comprises inward coupling elements 20 for this purpose, which are designed to couple the reflected fractions 19 into a second light guidance apparatus 21 of the receiving apparatus 12. One of the scanning directions A1, A2, A3 is assigned here to each inward coupling element 20. The second light guidance apparatus 21 guides the reflected fractions 19 to a light-sensitive sensor 22 of the receiving apparatus 12, where the light-sensitive sensor 22 and the light source 13 can be arranged on a common carrier. The distance of the object O1 from the attached part 5 can be determined on the basis of a transit time of the light 18, 19, i.e. on the basis of a transit time between the transmission of the light beams 18 and the reception of the reflected fractions 19 of the light beams 18.

Figure 3:
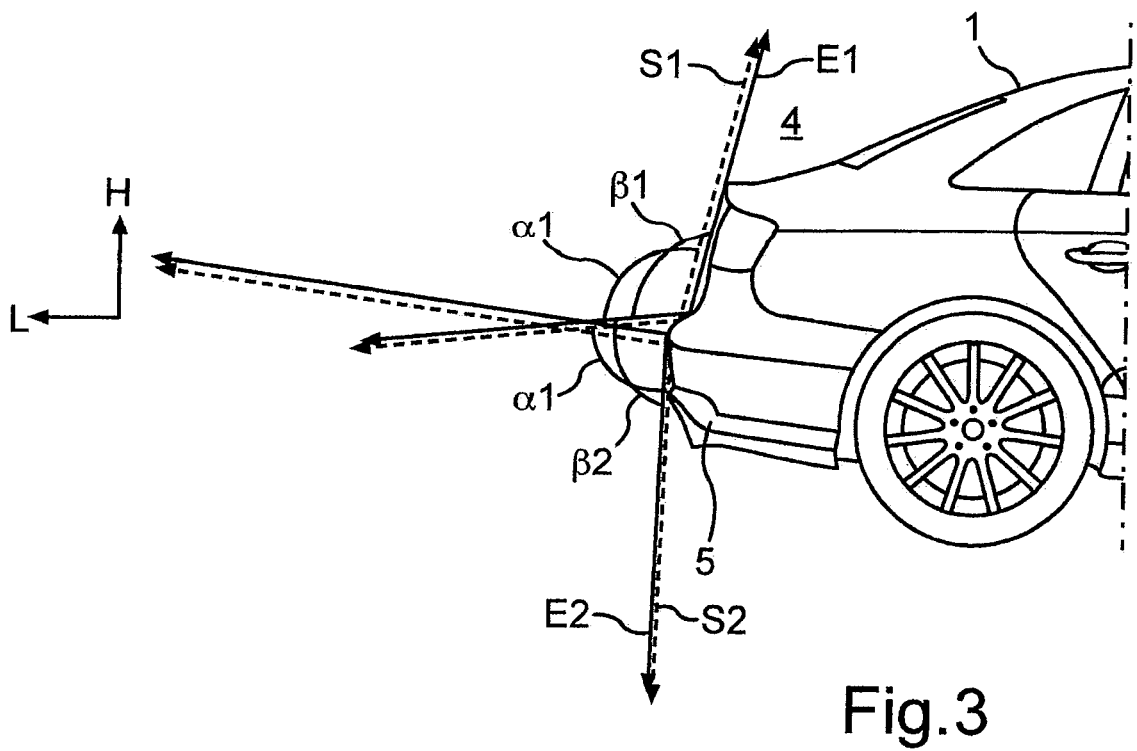
FIG. 3 shows a side view of a schematic illustration of a embodiment of a motor vehicle according to the invention.

A side view of the motor vehicle 1 is shown in FIG. 3. Two optical detection devices 3, which have different transmitting fields of view S1, S2 and different receiving fields of view E1, E2, are arranged here behind the bumper 5 of the motor vehicle 1, that is to say at a rear side of the bumper 5 that is not shown here. The transmitting apparatus 11 of the first detection device 3 here orients the light beams 18 with an upward incline. In relation to a vehicle longitudinal direction L of the motor vehicle 1, a first transmitting field of view S1 of the transmitting apparatus 11, whose vertical aperture angle α1 is shown here, is hereby oriented in the upward direction H of the vehicle upward at an incline, or is pivoted upward. A receiving field of view E1 of the receiving apparatus 12, whose vertical aperture angle β1 is shown here, is hereby also pivoted upward in the upward direction H of the vehicle. The transmitting apparatus 11 of the second detection device 3 transmits the light beams 18 with a downward incline. In relation to a vehicle longitudinal axis L, a transmitting field of view S2 of the transmitting apparatus 11, whose vertical aperture angle α2 is shown here, is pivoted downward, against the upward direction H of the vehicle. A receiving field of view E2 of the receiving apparatus 12, whose vertical aperture angle 12 is shown here, is hereby also pivoted downward against the upward direction H of the vehicle. Pedestrians in the surrounding region 4 of the motor vehicle 1 can, for example, be recognized by means of the first detection device 3. Objects close to the ground, such as kerbstones, can for example be recognized by means of the second detection device 3.

Figure 4A:
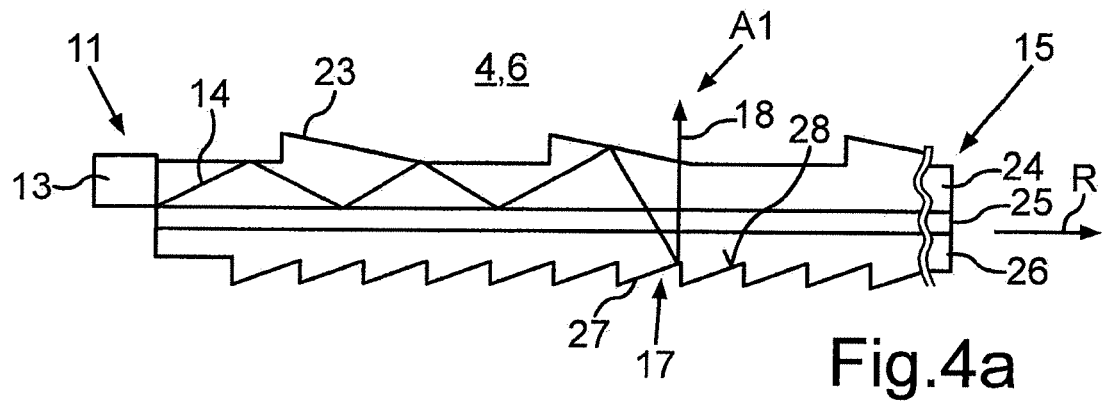
FIGS. 4a, 4b show schematic illustrations of a transmitting apparatus and a receiving apparatus of a embodiment of an optical detection device.
Figure 4B:
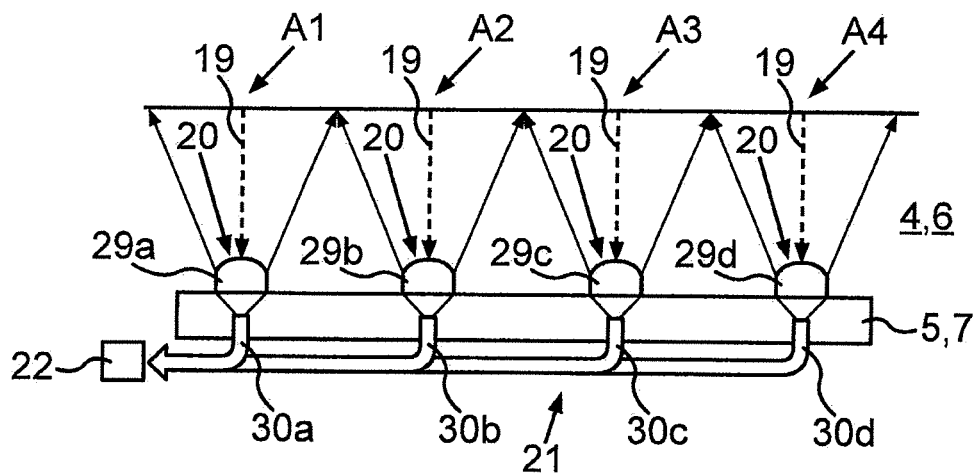

FIG. 4a shows a transmitting apparatus 11 according to a first embodiment of the optical detection device 3. FIG. 4b shows a receiving apparatus 12 according to the first embodiment of the optical detection device 3. In accordance with FIG. 4a, the first light guidance apparatus 15 of the transmitting apparatus 11 is designed as an optical waveguide 23. The elongated optical waveguide 23 is here constructed in layers, and comprises a first main layer 24 with a specific refractive index and a second layer 25 with a specific refractive index. The optical waveguide 23 is designed to guide the light 14 emitted from the light source 13 along the light guidance direction R through total reflection. The optical waveguide 23 is also surrounded or cladded in some regions by a reflective layer 26 with a specific refractive index which extends along a length of the optical waveguide 23.

Figure 5:
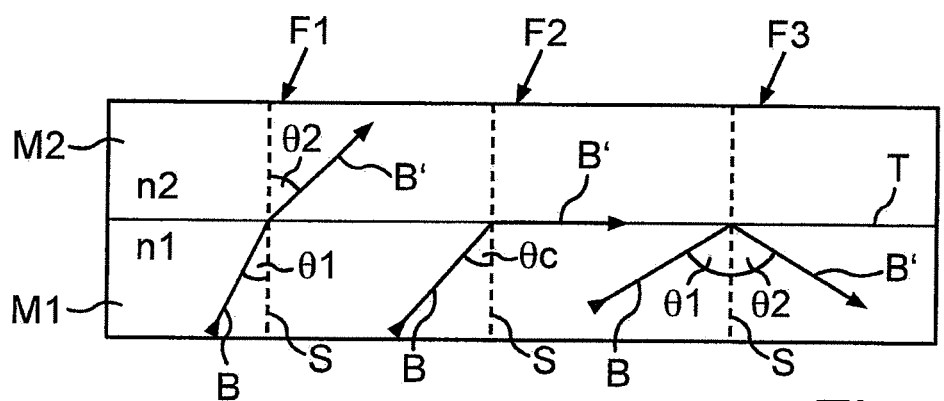
FIG. 5 shows a schematic illustration of beam paths of a light beam at a boundary surface between two media.

The principle of the light propagation in a medium M1 is illustrated in FIG. 5 by various beam paths F1, F2, F3. A light beam B which, from an optically denser medium M1, such as water, with a first refractive index n1, meets a boundary surface T between the optically denser medium M1 and an optically less dense medium M2, such as air, with a second refractive index n2, is refracted away from the normal at the point of incidence S in accordance with Snell's law of refraction. The normal at the point of incidence S is oriented perpendicularly to the boundary surface T. Referring to a first beam path F1, FIG. 5 shows that an angle of refraction θ2 between the normal at the point of incidence S and the refracted light beam B' is greater than an angle of incidence θ1 between the light beam B and the normal at the point of incidence S. If the angle of incidence θ1 is increased, the refracted light beam B' runs parallel to the boundary surface T at a particular value, as is shown in FIG. 5 with reference to a second beam path F2. This angle is called the boundary angle for total reflection, or else the critical angle θc. For angles of incidence θ1 of the light beam B greater than θc, the light beam B, instead of being refracted, is totally reflected at the boundary surface T. The angle of reflection θ2 is equal to the angle of incidence θ1. The total reflection is illustrated in FIG. 5 with reference to a third beam path F3.

Figure 6:
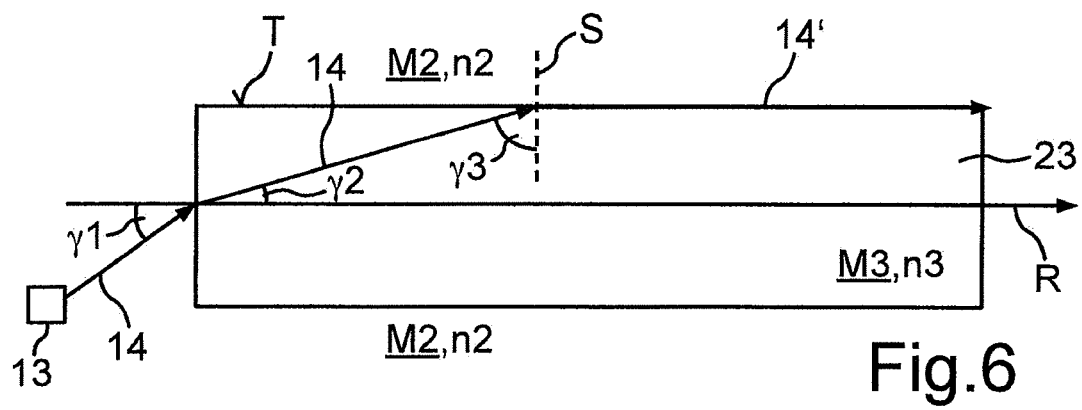
FIG. 6 shows a schematic illustration of a beam path of a light beam in an optical waveguide of a transmitting apparatus.

As shown in FIG. 6, the optical waveguide 23 comprises a third medium M3 with a third refractive index n3. The third medium M3 is, in particular, PMMA (polymethylmethacrylate). In order now to guide the light 14 emitted by the light source 13 in the optical waveguide 23 by means of total reflection, the light 14 emitted from the light source 13 must initially be less than a first angle γ1, at which the light 14 enters from the second medium M2, for example air, into the third medium M3 through an inward coupling surface oriented perpendicularly to a propagation direction R. The light 14 entering here at the first angle γ1 is refracted at a second angle γ2 with respect to the light propagation direction R. The light 14, refracted at the second angle γ2, meets this at a third angle γ3 with respect to the normal at the point of incidence S at the boundary surface T between the third medium M3 and the second medium M2. This third angle γ3 here corresponds to the critical angle θc, as a result of which the refracted light 14' is guided parallel to the boundary surface T. As soon as the angle of incidence is greater than the third angle γ3, the light 14 is reflected totally and guided in the optical waveguide 23. Snell's law of refraction, n1*sin(θ1)=n2*sin(θ2), can be used for an exemplary calculation of the angles γ1, γ2, γ3. Applied to the angles γ1, γ2, γ3, and with knowledge that the refractive index of air is n2=1 and of PMMA is n3=1.485, Snell's law of refraction yields 1.485*sin(γ3)=1*sin(90°) for the third angle γ3≥42.3°, and γ2: 47.7° for the second angle. The first angle is found from 1.485*sin(γ2)=1*sin(γ21) to be γ1>90°.

In order now to transmit the light 14 emitted by the light source 13 of the transmitting apparatus 11 according to FIG. 4a into the region 4, 6, that is to say to couple it out of the optical waveguide 23, the total reflection of the light 14 at the boundary surface T is interrupted. For this purpose, the optical waveguide 23 comprises the reflective layer 26 with a reflecting microstructure 28 which here has a sawtooth form. Structured regions 27 of the reflecting microstructure 28 form the outward coupling elements 17. The structured regions 27, of which only the structured region 27 corresponding to the first scanning direction A1 is illustrated here, interrupt the total reflection, and can reflect a fraction of the light 14 in the direction of the region 4, 6, wherein the fraction of the light 14 emerges into the region 4, 6 as a light beam 18 oriented along the scanning direction A1. The scanning direction A1 along which the light beam 18 emerges can be influenced by a density, a size, a depth and an edge sharpness of the microstructure 28.

In particular, the structured regions 27 here have different reflectivities or reflectances along the light guidance direction R. Beginning from the light source 13, the reflectance of the structured regions 27 increases. This means that a first structured region 27 with a first distance from the light source 13 has a first reflectivity, a second structured region 27 with a second distance from the light source 13 that is larger compared to the first distance has a second reflectivity that is larger compared to the first reflectivity, etc. As a result, a respective proportion of the light 18 coupled out in relation to the light 14 guided in the optical waveguide 23 rises with increasing distance of the structured regions 27 from the light source 13. As a result of coupling out the light 18 along the light guidance direction R, the quantity of light namely reduces with increasing distance from the light source 13. In order nevertheless to obtain a homogeneously illuminated transmission field of view S1, S2, the reflectance of the structured region 27 is adjusted.

FIG. 4b shows the receiving apparatus 12 corresponding to the transmitting apparatus 11 according to FIG. 4a. The receiving apparatus 12 here comprises lens elements 29a, 29b, 29c, 29d as the inward coupling elements 20, where one lens element 29a, 29b, 29c, 29d is assigned here to each scanning direction A1, A2, A3, A4. The lens elements 29a, 29b, 29c, 29d are arranged adjacent to the region 4, 6, for example at a front side of the attached part 5, 7. The lens elements 29a, 29b, 29c, 29d are in particular recessed at least partially into the attached part 5, 7. Each lens element 29a, 29b, 29c, 29d is designed to collect the fraction 19 of the light beam 18 reflected out of the respective scanning direction A1, A2, A3, A4 and to couple them into the second light guidance apparatus 21. The second light guidance apparatus 21 comprises an optical waveguide 30a, 30b, 30c, 30d for each scanning direction A1, A2, A3, A4 or each scanning direction region, said waveguide being designed to guide the fraction 19 of the light beam 18 coupled in through the respective lens element 29a, 29b, 29c, 29d. For this purpose, each optical waveguide 30a, 30b, 30c, 30d is optically coupled with one of the lens elements 29a, 29b, 29c, 29d for this purpose, wherein each optical waveguide 30a, 30b, 30c, 30d forms a receiving channel with the associated lens element 29a, 29b, 29c, 29d. The number of receiving channels depends in particular here on the receiving field of view E1, E2 to be generated and on the target region or region 4, 6 to be detected.

Each optical waveguide 30a, 30b, 30c, 30d is moreover coupled to a respective sensor region of the sensor 22, wherein each sensor region in particular only detects the scanning direction A1, A2, A3, A4 assigned to the optical waveguide 30a, 30b, 30c, 30d. Thus, as soon as a sensor region receives the reflected fraction 19 of the light beam 18, the scanning direction A1, A2, A3, A4 from which the fraction 19 of the light beam 18 was reflected is already known. The sensor 22 thus resolves angles, since each sensor region can recognize the respective scanning direction A1, A2, A3, A4, and thereby the orientation of the object O1, O2, on the basis of the associated optical waveguide 30a, 30b, 30c, 30d and of the lens element 29a, 29b, 29c, 29d belonging to the optical waveguide 30a, 30b, 30c, 30d. The sensor region can recognize the distance of the object O1, O2 from the attached part 5, 7 with reference to a transit time of the light.

Figure 7:
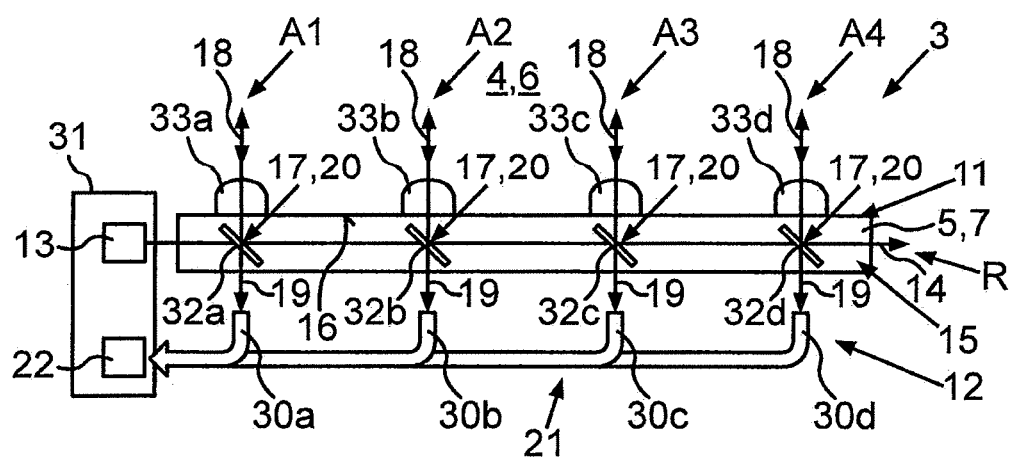
FIG. 7 shows a schematic illustration of a further embodiment of an optical detection device according to the invention.

FIG. 7 shows a further embodiment of the optical detection device 3. The light source 13 and the sensor 22 are arranged on a common carrier 31. The first guiding element 15 is here formed by beam splitters 32a, 32b, 32c, 32d that are arranged, spaced apart from one another, starting from the light source 13, in the light guidance direction R along the surface 16 of the attached part 5, 7. To guide the light 14 emitted from the light source 13, the beam splitters 32a, 32b, 32c, 32d can transmit respective fractions of the light 14. This means that the first beam splitter 32a, which corresponds to the first scanning direction A1, transmits a fraction of the light 14 in the light guidance direction R to a second beam splitter 32b which corresponds to the second scanning direction A2, and that the first beam splitter 32a reflects a fraction of the light 14 perpendicularly to the light guidance direction R. The reflected light is transmitted as a light beam 18 along the scanning direction A1 into the region 4, 6. The fraction of the light 14 that is transmitted by the first beam splitter 32a to the second beam splitter 32b is in turn partially transmitted and partially reflected. The fraction reflected by the second beam splitter 32b is transmitted into the region 4, 6 as a light beam 18 oriented along the second scanning direction A2. The transmitted fraction is guided to a third beam splitter 32c which corresponds to the third scanning direction A3, etc. The beam splitters 32a, 32b, 32c, 32d thus additionally function as the outward coupling elements 17.

A transmissivity of the beam splitters 32a, 32b, 32c, 32d here falls along the light propagation direction R with increasing distance from the light source 13. This means that the proportion of the light 14 guided to the respective beam splitter 32a, 32b, 32c, 32d that is transmitted by the beam splitters 32a, 32b, 32c, 32d becomes smaller as the distance from the light source 13 increases. It can be thereby ensured that a quantity of light of the light 14 coupled out as the light beam 18 remains approximately constant, so that the region 4, 6 is illuminated homogeneously or evenly. To widen the light beams 18, and thus to enlarge the field of view S1, S2, E1, E2 of the optical detection device 3, said device comprises lens elements 33a, 33b, 33c, 33d or collimator lenses, which can be designed as micro-lenses and which are arranged in an optical path between the beam splitters 32a, 32b, 32c, 32d and the region 4, 6.

The reflected fraction 19 of the light beam 18 can be guided again to the receiving apparatus 12 via the lens elements 33a, 33b, 33c, 33d, which are arranged at least in regions in the attached part 5, 7. The fraction 19 of the light beams 18 reflected out of the respective scanning direction A1, A2, A3, A4 is then guided to the beam splitters 32a, 32b, 32c, 32d which transmit the respective fractions 19 of the light beams 18 to optical waveguides 30a, 30b, 30c, 30d of the receiving apparatus 12. The beam splitters 32a, 32b, 32c, 32d thus also constitute the inward coupling elements 20 of the receiving apparatus 12. The optical waveguides 30a, 30b, 30c, 30d guide the fraction 19 of the light beam 18 originating from the respective scanning direction A1, A2, A3, A4 to the associated sensor region of the sensor 22 which can determine the orientation of the object O1, O2 and also the distance of the object O1, O2. One beam splitter 32a, 32b, 32c, 32d and one optical waveguide 30a, 30b, 30c, 30d thus here constitute a receiving channel. According to the embodiment of the optical detection device 3 according to FIG. 7, the transmitting apparatus 11 and the receiving apparatus 12 thus use the same lens elements 33a, 33b, 33c, 33d.

In summary, the optical detection device 3 is designed to be able to be flexibly shaped, such that there are very few restrictions on the installation location of the optical detection device 3 at the motor vehicle 1. The optical detection device can thus be integrated with a saving of space in attached parts 5, 7, so that the optical detection device 3 does not have to be borne in mind when designing the shape of the attached part 5, 7.

The invention claimed is:

1. An optical detection device for arranging on an attached part of a motor vehicle and for monitoring a region adjacent to the attached part, the optical detection device comprising:
   a transmitting apparatus comprising a light source emitting light, and
   a receiving apparatus comprising a light-sensitive sensor, wherein the transmitting apparatus transmits light beams along predetermined scanning directions into the region, and the receiving apparatus receives fractions of the light beams reflected in the region,
   wherein the transmitting apparatus comprises:

a first light guidance apparatus for guiding the light emitted from the light source along a surface of the attached part, and at least two outward coupling elements corresponding to respective scanning directions for outward coupling of fractions of the guided light as the light beams oriented along the respective scanning direction, wherein the first light guidance apparatus comprises an optical waveguide for guiding the light emitted by the light source along the surface of the attached part, wherein the optical waveguide comprises at least two reflection elements corresponding to respective scanning directions to form the outward coupling elements, said elements being configured to reflect a respective fraction of the light guided in the optical waveguide along the respective scanning direction into the region, wherein the at least two reflection elements collectively form a layer with a reflecting structure partially surrounding the optical waveguide extending along a length of the optical waveguide, wherein the reflection elements are formed as structured regions of the reflecting structure and reflect fractions of the light guided in the optical waveguide as the light beams into the region adjacent to the attached part, and wherein the receiving apparatus comprises:

at least two inward coupling elements corresponding to respective scanning directions for coupling in the fractions of the light beams reflected out of the region along the respective scanning direction, and a second light guidance apparatus for guiding the inwardly coupled fractions of the light beams to the light-sensitive sensor.

2. The optical detection device according to claim 1, wherein the light source and the light-sensitive sensor are arranged on a common carrier, wherein the first light guidance apparatus guides the light emitted by the light source starting from the carrier along the surface of the attached part, and the second light guidance apparatus feeds the reflected fractions of the light beams back along the surface to the carrier.

3. The optical detection device according to claim 1, wherein the second light guidance apparatus comprises optical waveguides corresponding to the scanning directions, wherein each optical waveguide is optically coupled to one of the inward coupling elements, and guides the respective fraction of the light beams reflected out of the region along the scanning direction to the light-sensitive sensor.

4. The optical detection device according to claim 3, wherein each optical waveguide is optically coupled to at least one sensor region comprising at least one sensor element of the light-sensitive sensor.

5. The optical detection device according to claim 1, wherein the reflection elements are arranged with a spacing from one another starting from the light source, wherein a reflectivity of the respective reflection elements is predetermined depending on a spacing of the respective reflection elements from the light source.

6. The optical detection device according to claim 1, wherein the reflecting structure of the reflecting layer has a sawtooth form.

7. The optical detection device according to claim 1, wherein the receiving apparatus further comprises lens elements corresponding to the scanning directions for the formation of the inward coupling elements, said lens elements being configured to catch the fractions of the light beams reflected out of the region along the respective scanning directions and to couple them into the second light guidance apparatus.

8. The optical detection device according to claim 1, wherein the first light guidance apparatus comprises at least two beam splitters corresponding to the scanning directions said splitters being configured to guide the light emitted from the light source along the surface of the attached part through transmission, wherein the beam splitters are configured, for the formation of the outward coupling elements, to reflect fractions of the light as the light beams into the region along the respective scanning direction and, for the formation of the inward coupling elements, to transmit the fractions of the light beams reflected along the respective scanning direction and feed them to the second light guidance apparatus.

9. The optical detection device according to claim 8, wherein the beam splitters are arranged with a spacing from one another starting from the light source, wherein a transmissivity of the respective beam splitters is predetermined depending on a spacing of the respective beam splitters from the light source.

10. The optical detection device according to claim 8, wherein the optical detection device comprises lens elements corresponding to the scanning directions which are arranged in a beam path between the beam splitters and the region and which are configured to transmit the light beams reflected by the beam splitters along the respective scanning direction into the region and to transmit the fraction of the light beams reflected out of the region along the respective scanning direction out of the region to the beam splitters.

11. An attached part for a motor vehicle comprising: at least one optical detection device according to claim 1, wherein the light guidance apparatuses of the at least one optical detection device are arranged at a side of the attached part facing away from the region and are configured to guide the light along the surface of the side of the attached part.

12. The attached part according to claim 11, wherein the attached part is a bumper or an interior component of the motor vehicle.

13. A motor vehicle with at least one attached part according to claim 11.

* * * * *